United States Patent

Hoppie

[11] Patent Number: 6,013,959
[45] Date of Patent: Jan. 11, 2000

[54] LAMINATION STRUCTURE FOR AN ELECTROMAGNETIC DEVICE

[75] Inventor: Lyle O. Hoppie, West Bloomfield, Mich.

[73] Assignee: Eaton Corporation, Cleveland, Ohio

[21] Appl. No.: 09/088,388

[22] Filed: Jun. 1, 1998

[51] Int. Cl.[7] .................................................. H02K 41/00
[52] U.S. Cl. ................................................................ 310/12
[58] Field of Search ............................. 310/12, 13, 14, 310/42

[56] References Cited

U.S. PATENT DOCUMENTS 4,211,944   7/1980   Haller ........................................... 310/72

*Primary Examiner*—Thomas M. Dougherty
*Assistant Examiner*—Judson H. Jones
*Attorney, Agent, or Firm*—Loren H. Uthoff, Jr.

[57] ABSTRACT

A lamination structure for an electromagnetic device such as a linear machine having a coaxially aligned field assembly and armature assembly. In one embodiment, the field assembly reciprocates relative to the armature assembly to actuate the valve. One configuration has a field assembly with a number of axially oriented annular permanent magnets separated by a ferromagnetic material comprised of a stack of relatively thin ferromagnetic discs which are oriented such that the geometric planes of the discs are generally perpendicular to the working magnetic field and mounted on a non-magnetic shaft. The discs are sized to optimize the conduction of the working magnetic flux while minimizing eddy currents. The housing for the device is comprised of a plurality of tubular laminations. The preferred construction provides a reluctance force which helps maintain the valve in an open or closed state without any current applied to the device.

10 Claims, 3 Drawing Sheets

LAMINATION STRUCTURE FOR AN ELECTROMAGNETIC DEVICE

RELATED APPLICATIONS

This application is related to U.S. Ser. No. 09/088,340 having an attorney's docket No. 96-rECD-537-1 filed on the same date as this application and entitled "System and Method For Regenerative Electromagnetic Engine Valve Actuation" and assigned to the same assignee, Eaton Corporation, as in this application.

1. Technical Field

The present invention relates to a system and method for providing a lamination structure for an electromagnetic device such as a solenoid. More specifically, the present invention relates to a system and method for providing a lamination structure for an electromagnetic device where a multiplicity of stacked steel discs are orientated with the air gaps generally perpendicular to the magnetic field.

2. Background Art

Laminations have been used in electromagnetic machines to reduce the unwanted effects of eddy current fields which reduce the efficiency of the machine. Traditionally, the laminations which are made of a magnetic material such as iron have been oriented so that the eddy currents cannot flow as they would if laminations were not used. The modified direction and amplitude of the eddy currents results in an induced magnetic field which opposes the working magnetic field by only a slight amount. The working magnetic flux flows through the major dimension of the lamination without crossing the air gaps of the laminations.

SUMMARY OF THE INVENTION

At frequencies above about 60 Hz, the lamination structure of an electromagnetic device can be changed to counter the traditional thinking. Using the present invention, the laminations are oriented to take advantage of the fringing effects of AC magnetic fields to enable the main working flux to exist where it would otherwise be shielded by eddy currents. This facilitates the construction of various electromechanical devices. As operating frequencies increase, induced eddy currents cause the magnetic flux to fringe to the peripheral surface of a conductor. Using the present invention, the laminations are now orientated such that the working magnetic flux passes through the minimum dimension of the lamination without a great degradation in the strength of the flux.

One provision of the present invention is to alter the orientation of the lamination structure in an electromagnetic machine to facilitate the construction of the device.

Another provision of the present invention is to alter the orientation of the lamination structure in an electromagnetic machine operating at relatively high frequency such that the main working flux passes through the laminations in a direction perpendicular to the geometric plane of the laminations.

Another provision of the present invention is to use a laminated steel tube to form the housing of an electromagnetic machine.

Still another provision of the present invention is to use a plurality of steel discs stacked together to make up the ferromagnetic material in an electromagnetic machine for ease of manufacture.

DETAILED DESCRIPTION OF THE PREFERRED EMBODIMENT

Figure 1:
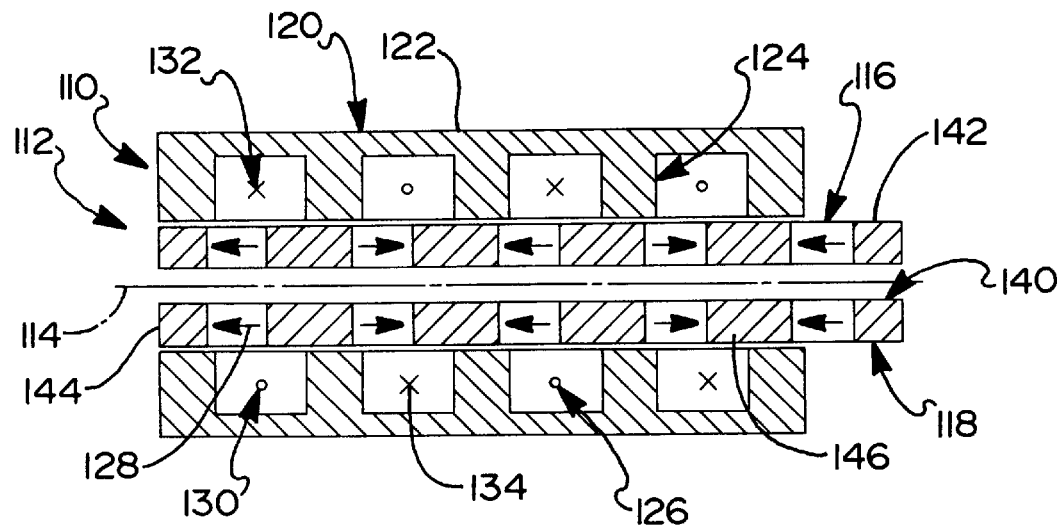
FIG. 1 is a cross-sectional view of an electromagnetic machine with powdered metal construction.

For purposes of promoting an understanding of the principals of the invention, reference will now be made to the embodiment illustrated in the drawings and specific language will be used to describe same. It will nevertheless be understood that no limitation of the scope of the invention is thereby intended, such alterations and further modifications in the illustrated device, and such further applications of the principals of the invention as illustrated therein being contemplated as would normally occur to one skilled in the art to which the invention relates.

In the disclosure, certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the electromagnetic device of the present invention. The terms "upward" and "downward" will refer to directions as taken in the drawings in connection with which the terminology is used. All foregoing terms mentioned above include the normal derivations and equivalents thereof.

Now referring to FIG. 1 of the drawings, a cross-sectional view of an electromagnetic actuator is shown and is described in co-pending application U.S. Ser. No. 09/088,340 having an attorney's docket No. 96-rECD-537-1. Actuator 110 includes an annular field assembly 112 coaxially aligned relative to axis 114. Field assembly 112 includes a first plurality of annular field elements 116 each creating a generally axially oriented magnetic field. Field assembly 112 also includes a plurality of annular ferromagnetic elements 118 alternatingly interposed with the ferromagnetic element 116. An annular armature assembly 120 is coaxially aligned with field assembly 112 along axis 114. Armature assembly 120 includes a generally cylindrical or cylindraceous ferromagnetic housing 122 having a plurality of axially spaced members 124 extending radially inward toward field assembly 112 and separating each of the plurality of coils, generally indicated by reference numeral 126. Arrows 128 indicate the orientation or polarity of the magnetic field elements 116 with the arrowhead corresponding to "North" and the tail of the arrow corresponding "South". The winding direction of coils 126 is indicated using a "dot" to denote conductors extending out of the page, as indicated by reference numeral 130, and an "X" to denote conductors extending into the page, as indicated by reference numerals 132 and 134. Preferably, coils 126 are connected in series and are formed of a single insulated conductor. Also, preferably, annular field elements 116 are permanent magnet material is a neodymium—iron-boron material such as Crumax 2830 made by Crucible Magnetics.

Field assembly 112 is shown with five field elements 116 (axially polarized permanent magnets in one embodiment)

and six ferromagnetic elements 118 assembled on a non-magnetic shaft (not shown). Any number of field elements 116 and corresponding ferromagnetic elements 118 could be used in actuator 110. One skilled in the art will also recognize that the permanent magnet assembly could be configured outside of the coil assembly.

FIG. 1 includes a field assembly 112 having an inner radius 140 of about 2 mm and an outer radius 142 of about 6 mm. Field magnetic elements 118 include end elements 144 having an axial length of about 4 mm and intermediate elements 146 having an axial length of about 8 mm. The prototype armature assembly 120 includes four coils 126 having an inner radius of about 6.5 mm, an outer radius of 13 mm and an axial length of about 9 mm. The outer radius of housing 122 for one prototype was about 15 mm. Ferromagnetic members 124 include inner members having an axial length of about 5 mm and outer members having an axial length of about 5.5 mm.

Figure 4:
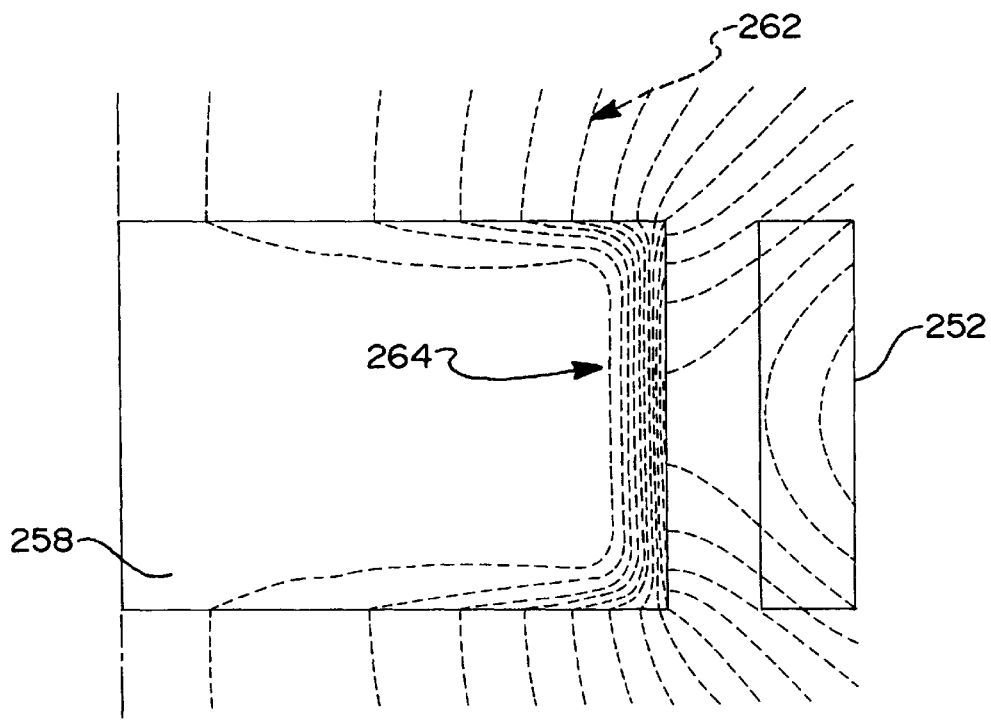
FIG. 4 illustrates a magnetic field within a relatively thick ferromagnetic disc at 300 Hz.

Preferably, the number of field elements 116 exceeds the number of coils 126 so the magnetic field at each of the end coils is substantially the same as at the inner coils. As such, the magnetic field at the end coils is about the same as at the inner coils whether the field assembly 112 is in the lower position, an intermediate position or in an upper position. This condition would not prevail if the number of field elements 116 was less than or equal to the number of coils 126. For one embodiment of the present invention, field assembly 112 has an axial length of about 70 mm and provides a stroke or travel of about 8 mm. Armature assembly 120 has an axial length of about 62 mm so that the field assembly protrudes about 8 mm beyond the armature assembly as illustrated in FIGS. 2 and 4.

Coils 126 are preferably wet wound with a thermopoxy material such as P. D. George/Sterling U-300 thermopoxy, so that the finished coils do not have a mandrel. For the constructed prototype, the plurality of coils 126 were formed using an insulated conductor, such as AWG 21 copper wire. The resistance of the finished coils was about 0.250 ohms. The cross sectional area of the coils was about 58.5 mm$^2$. The coils are wound with a predetermined number of turns (such as 90), and the ends of the coils are interconnected so as to reverse the sense of adjacent coils as illustrated with the symbols "X" and "O" in FIG. 1. As such, the adjacent coils generate magnetic fields having opposite sense (orientation or polarity) when a current is applied.

The ferromagnetic material used for the housing 122 and/or field magnetic elements 118 is preferably a high permeability material with low eddy current loss characteristics. Powdered iron can be formulated to yield the desired characteristic or the material can be a traditional iron. An example of a suitable powdered iron material is Ancorsteel SC 100 manufactured by Hoeganaes Corporation. The ferromagnetic material should preferably exhibit negligible eddy current up to and beyond the typical operating frequencies such as 300 Hz. The assembly and operation of the actuator 110 is explained in greater detail in co-pending application having an attorney's reference number of 96-rECD-537 the disclosure of which is hereby incorporated by reference.

Figure 2:
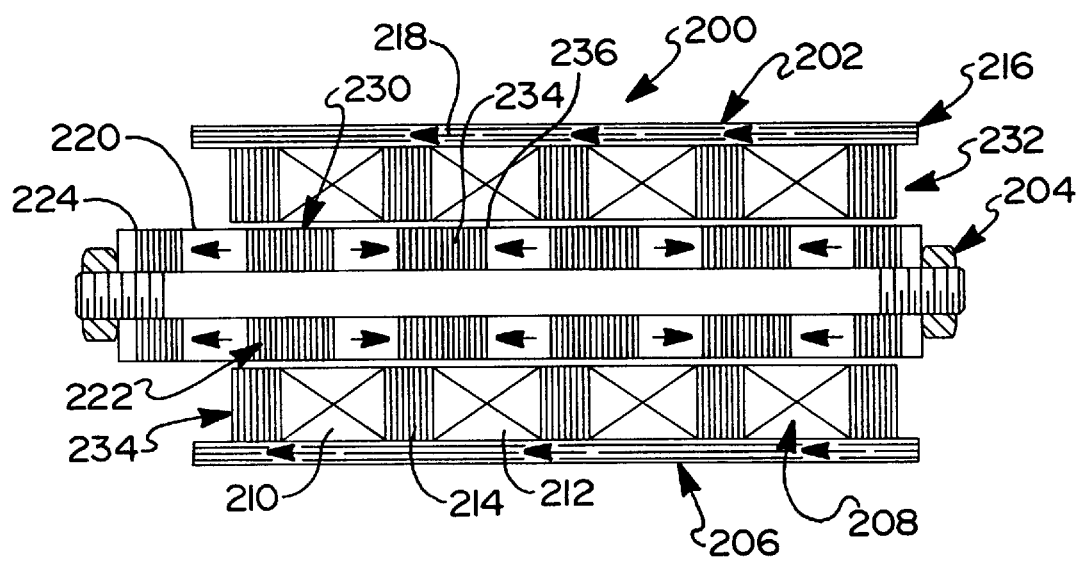
FIG. 2 is a cross-sectional view of the electromagnetic machine of the present invention.

Now referring to FIG. 2 of the drawings a cross-sectional view of the electromagnetic machine (actuator) using the lamination orientation of the present invention is shown. According to the present invention a preferred embodiment of a linear machine for use as an engine valve actuator according to the present invention is illustrated. Actuator 200 includes an armature assembly 202 which generally surrounds a field assembly 204 and is coaxially aligned relative thereto. Armature assembly 202 includes a ferromagnetic cylindraceous tube 206 surrounding a plurality of coils 208 which include proximate coils 210 and 212 separated by a plurality of annular field magnetic discs 214 disposed therebetween. Preferably, tube 206 includes a plurality of laminations or layers 216 which are generally coaxially aligned with field assembly 204. In one preferred embodiment, tube 206 is formed using a sheet of ferromagnetic material which is rolled to form a plurality of circumferential layers or laminations 216. Most preferably, tube 206 is formed using silicon steel with an axially oriented grain, indicated generally by arrows 218.

Field assembly 204 includes a plurality of field elements 220 axially separated by a plurality of ferromagnetic elements 222, which are preferably a plurality of steel discs 224. The ferromagnetic discs 224 preferably each have a thickness of about twice their associated skin depth to reduce eddy currents within the discs. In one embodiment of the present invention, field elements 222 include four sets of inner elements 230 and two sets of outer elements 232. Each of the inner elements 230 have about twenty discs 234 having an axial thickness or length of about 0.38 mm. This provides an axial length of about 8 mm for each inner element 230. Likewise, armature assembly 202 preferably includes five ferromagnetic elements 234 each having a plurality of ferromagnetic discs 214 with each disc having an axial thickness of about 0.38 mm. Tube 206 is preferably constructed using four turns of silicon steel having a thickness of about 0.279 mm with an axially oriented grain. Armature assembly 202 including tube 206, coils 208, and ferromagnetic elements 234 are preferably assembled and vacuum/pressure impregnated with an epoxy and hardener to form an integral unit, such as P. D. George/Pedigree No. 108 epoxy and No. 109 hardener. Unlike prior art devices, wherein the laminations are coplanar with the magnetic field, the discs of the present invention are orientated such that the air gaps are generally perpendicular to the working magnetic field.

While it is well known that laminations should generally be coplanar with the magnetic field to reduce eddy currents, a linear machine constructed according to the present invention will produce a magnetic field with both axial and radial components. As such, ideal laminations would be pie-shaped segments extending the entire length of the actuator. In practice, such laminations are difficult to produce. Therefore, laminations positioned in the directions illustrated in FIG. 2 are in the "wrong direction", i.e. against conventional wisdom, but result in acceptable operation provided the thickness and direction of the laminations, in addition to the number of laminations are selected appropriately.

Figure 3:
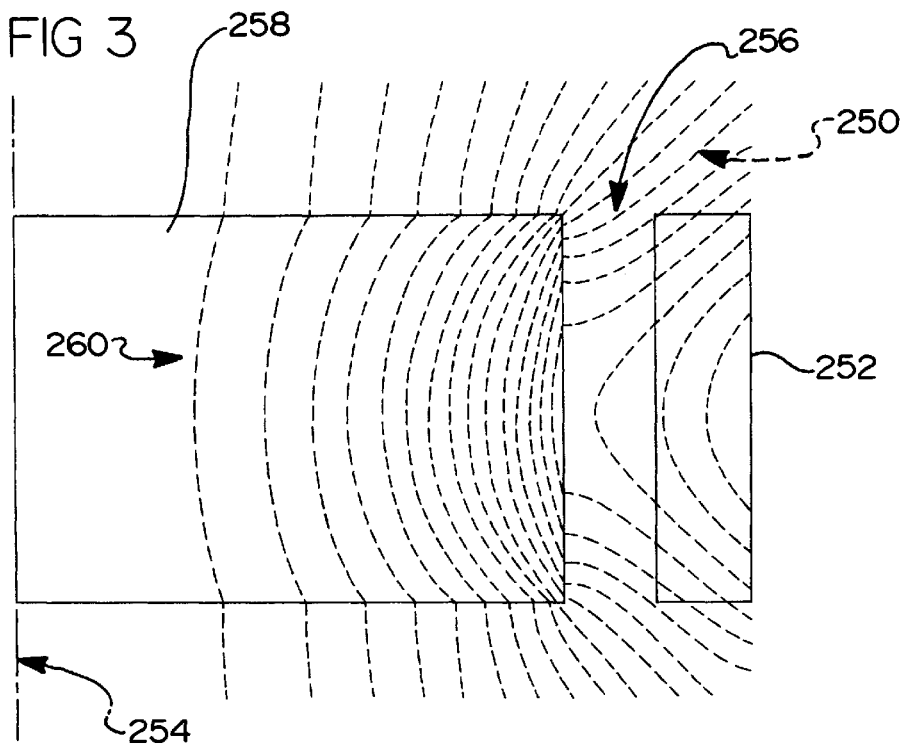
FIG. 3 illustrates a magnetic field within a relatively thick ferromagnetic disc at zero Hz.

Now referring to FIG. 3, a magnetic field within a relatively thick ferromagnetic disc is illustrated for a coil frequency of zero Hz. The illustration is FIGS. 3–6 were generated using OERSTED, a commercially available design and analysis program. FIG. 3 illustrates the magnetic field generated when a DC current is introduced into an annular coil surrounding an annular piece of ferromagnetic material. The coil 252 is shown in partial cross-section and is composed of an insulated conductor wound about a centerline 254. Coil 252 is separated by a radial clearance 256 from the solid ferromagnetic stator 258. The dimensions used for this representative illustration are similar to those of the previously described actuator 110 with the B-H curve for 1010 steel used to represent the magnetic properties of the ferromagnetic stator 258. Coil 252 generates a magnetic field having magnetic field lines 250 which penetrate the ferromagnetic stator 258 and are generally axially orientated with a slight concave arc 260 or perturbation relative to center line 254.

FIG. 4 illustrates the magnetic field present in the same construction as that of FIG. 3 but with a 300 Hz excitation current applied to coil 252. Induced eddy currents cause the magnetic field lines 262 to be generally excluded from the interior region of the ferromagnetic stator 258 and tend toward the outer periphery forming concave perturbations 264 relative to the center line 254. Thus, in the case of AC excitation current, the magnetic field enters and leaves the relatively thick ferromagnetic disc 258 in a similar manner to the case illustrated in FIG. 3 where the coil excitation voltage was DC. However, just inside the disc 258, magnetic field lines 262 are rapidly diverted to and from the outer cylindrical surface of disc 258. This diversion requires a finite predetermined axial length which can be related to the skin depth, δ, defined by:

$$\delta \equiv \sqrt{\frac{2}{\omega\mu\sigma}}$$

where ω represents the angular frequency, μ represents the permeability of the ferromagnetic material, and σ represents the electrical conductivity of the material.

Figure 5:
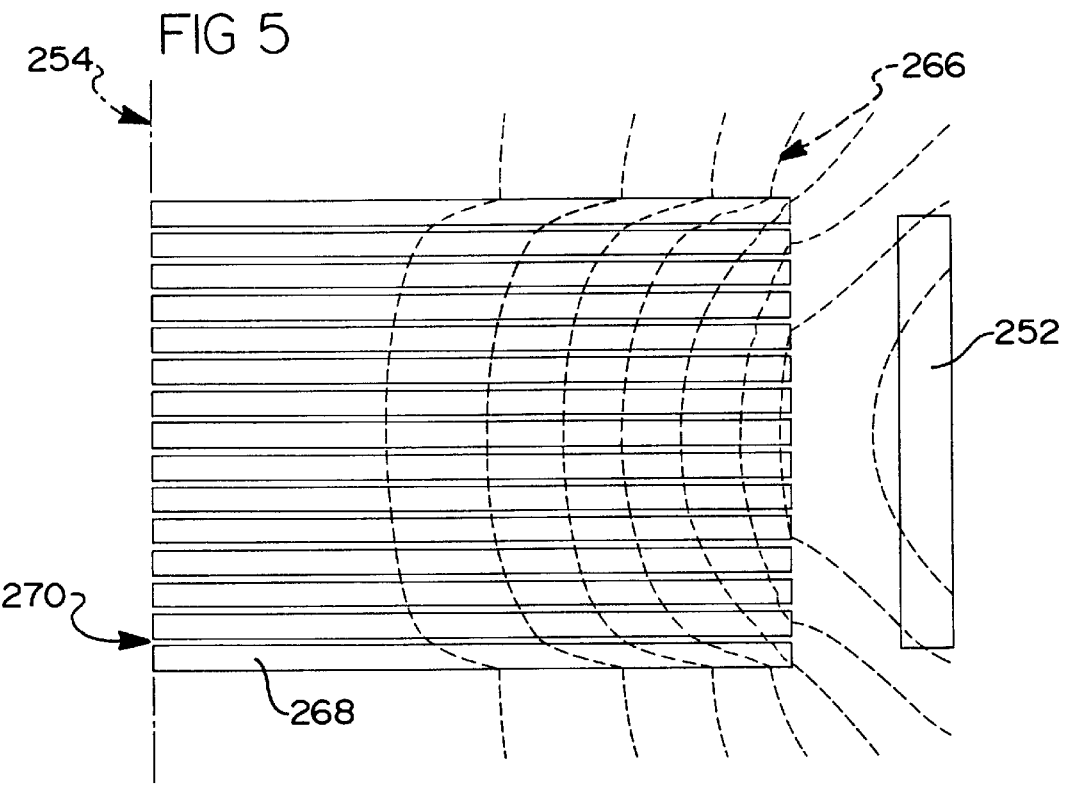
FIG. 5 illustrates a magnetic field within a stack of relatively thin ferromagnetic discs at zero Hz.
Figure 6:
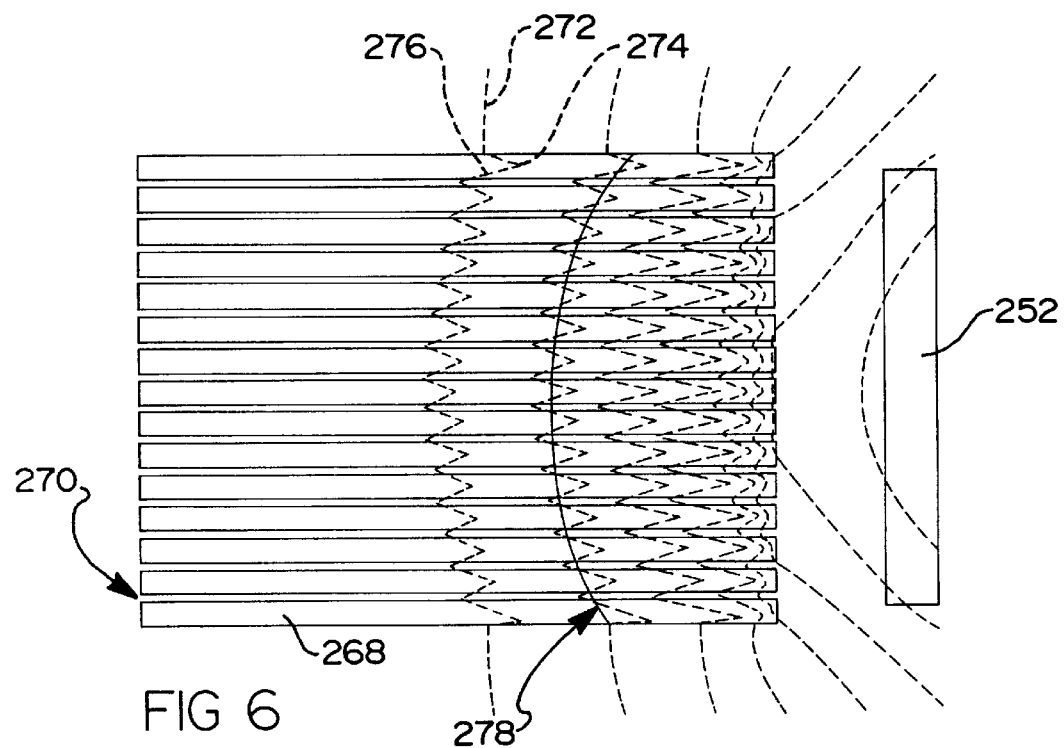
FIG. 6 illustrates a magnetic field within a stack of relatively thin ferromagnetic discs at 300 Hz.

Now referring to FIGS. 5 and 6, a cross-sectional illustrative view of a portion of the actuator 200 using the present invention is shown with magnetic flux lines shown with a coil excitation at zero Hz in FIG. 5 and at 300 Hz in FIG. 6. According to the present invention, the solid ferromagnetic material of the stator 258 is replaced by thin ferromagnetic discs (or washers) 268 each separated by a small air gap 270 to make up ferromagnetic stator 258 (field assembly). For example, the ferromagnetic elements 222 and the field magnetic discs 214 of the actuator 200 shown in FIG. 2 are made of this same unique construction with a plurality of discs having an air gap perpendicular to the main working magnetic field. This arrangement of the present invention is also illustrated in FIG. 6 but with a coil 252 excitation at 300 Hz. As shown in FIG. 6, at 300 Hz the magnetic field lines 272 enter the ferromagnetic stator 268' made up of the plurality of ferromagnetic discs 268 and have a first region 274 diverted away from the center line 254 which is followed by a second region 276 which s diverted toward center line 254. The excursions away from and toward the center line 254 produce an approximate resultant field line 278 which is remarkable and unexpectedly similar to field line 266 produced for a DC excitation of the coil 252 as illustrated in FIG. 5. The magnetic patterns shown in FIGS. 3, 5 and 6 are all very similar. This result is unexpected based on prior art lamination technology. The prior art taught that the laminations should be coplanar with the main working magnetic field to reduce eddy currents. The present invention teaches orienting a plurality of stacked laminations with the air gaps (or geometric plane of the laminations) perpendicular to the main working magnetic field with the laminations sized to produce the results shown in FIGS. 5 and 6.

As shown in FIGS. 5 and 6, if the ferromagnetic discs are sufficiently thin, the diversion of the magnetic field does not reach the outer periphery of the disc as was the case for the thick, solid disc illustrated in FIGS. 3 and 4. If the disc is thick in comparison with the skin depth, the field will be largely excluded by eddy currents and resulting induced magnetic fields; whereas, if the disc is thin in comparison to the skin depth, the magnetic field will largely penetrate the disc as illustrated in FIGS. 5 and 6. However, thinner discs require a larger number of discs for the desired thickness of the ferromagnetic material. This results in a larger number of air gaps between the discs which increases the reluctance. Thus, it is necessary to balance the number of discs, the air gap separation, and the thickness of the discs to achieve an optimum design.

The mechanical, electrical, and magnetic characteristics of a linear actuator according to the present invention clearly depend upon the particular geometry and size. As such, one of ordinary skill in the art will recognize the scaling laws which will affect the final design for a particular application.

It is understood, of course, that while the forms of the invention herein shown and described include the best mode contemplated for carrying out the present invention, they are not intended to illustrate all possible forms thereof. It will also be understood that the words used are descriptive rather than limiting, and that various changes may be made without departing from the spirit or scope of the invention as claimed below.

What is claimed is:

1. A lamination structure for an AC excited electromagnetic device characterized by a plurality of laminations oriented such that the working magnetic flux lines pass through said laminations approximately perpendicular to the geometric plane of said laminations wherein said laminations are ferromagnetic discs.

2. A lamination structure for an AC excited electromagnetic device characterized by a plurality of laminations oriented such that the working magnetic flux lines pass through said laminations approximately perpendicular to the geometric plane of said laminations wherein said laminations are ferromagnetic discs each having a thickness of about twice their associated skin depth.

3. An electromagnetic actuator for providing linear motion, the actuator comprising:

a armature assembly having a plurality of coils arranged in an axially alternating pattern with a plurality of ferromagnetic armature discs disposed therebetween, said armature assembly creating a first magnetic field when current is applied thereto; and a field assembly having a plurality of elements arranged in an axially alternating pattern with a plurality of ferromagnetic field discs disposed therebetween, the field assembly being coaxially aligned with said armature assembly and creating a second magnetic field which interacts with said first magnetic field to cause linear motion of said field assembly relative to the armature assembly.

4. The actuator of claim 3 wherein said ferromagnetic discs are steel discs.

5. The actuator of claim 3 wherein said ferromagnetic disc have an associated skin depth which is approximately one half of their thickness.

6. The actuator of claim 3 further comprising a ferromagnetic cylindraceous tube surrounding said field assembly.

7. The actuator of claim 6 wherein said tube includes a plurality of laminations generally coaxially aligned with the field assembly.

8. The actuator of claim 3 wherein said elements in said field assembly are permanent magnets.

9. The actuator of claim 3 wherein said elements in said field assembly are electrical coils.

10. The actuator of claim 3 wherein said ferromagnetic armature discs and said ferromagnetic field discs are made of powdered metal.

* * * * *